Patented Apr. 5, 1932

1,852,029

UNITED STATES PATENT OFFICE

JOHN G. RUCKELSHAUS AND NORMAN W. KEMPF, OF NEWARK, NEW JERSEY

ABSORBENT MATERIAL AND METHOD OF PREPARING THE SAME

No Drawing.  Application filed March 7, 1931. Serial No. 521,003.

This invention relates to absorbent materials and more particularly concerns an improved absorbent substance for use in refrigerating systems and a method of preparing this substance.

In refrigeration systems of the absorption type, a suitable refrigerant such as ammonia is alternately absorbed by and expelled from a liquid or solid substance. The absorption of refrigerant by the substance employed is usually effected by cooling the substance and the refrigerant is subsequently expelled from or distilled off from the absorbent by heat. In the past, solid substances such as calcium chloride have been used as absorbents for refrigerant gases because of the facility with which the ammonia or other refrigerant may be expelled from solid substances of this nature. Known solid absorbents are not entirely satisfactory due to the limited refrigerant absorbing capacity thereof and due also to the fact that these substances absorb and expel the refrigerant gas at an undesirably slow rate.

It is an object of the present invention to provide an improved solid substance for use as a refrigerant absorbent, this substance having an appreciably greater refrigerant absorbing capacity than known absorbents and being capable of absorbing and expelling refrigerant gases such as ammonia with greater rapidity and facility than is possible with known absorbents. Another object of the invention resides in the provision of an absorbent substance embodying the above properties and further having a substantial resistance to crushing strain. It is a further object of the invention to provide an improved method by which our absorbent substance may be prepared.

In general, the objects of our invention are carried out by forming a pasty water mixture of a quantity of calcium chloride with smaller quantities of ammonium and iron salts and baking the mixture to a solid mass. The decomposition of the ammonium and iron salts during the baking process results in the evolution of ammonia gas which escapes through the body of the mixture and imparts an extremely porous structure to the solidified substance. In certain cases, we prefer to add small quantities of sodium or potassium silicate to the mixture in order to increase the resistance thereof to crushing strain. In one embodiment of our invention, the solidified absorbent substance is subjected to contact with ammonia gas under pressure for a considerable period, this treatment resulting in an appreciable increase in the volume of the absorbent and imparting a light and fluffy texture thereto.

An example of one embodiment of our improved absorbent substance and a preferred method of preparing the same will now be given, it being understood that our invention is not limited to the exact proportions of ingredients or to the particular methods and steps here disclosed.

A mixture of about 100 parts of calcium chloride, 2 parts of an ammonium salt, such as ammonium chloride or ammonium nitrate, and one part of an iron salt, such as iron chloride or iron nitrate is first prepared. Sufficient water is added to the mixture to form a pasty mass which is then baked at a temperature of about 200° C. until the mass solidifies and all of the water is driven off. As explained above, during this baking process, considerable ammonia gas is evolved due to the decomposition of the iron and ammonium salts, and this gaseous ammonia expands and escapes through the plastic mass whereby an extremely porous structure is obtained. During the formation of the porous structure by the ammonia gas, iron oxide and other compounds of iron are distributed over the exposed surfaces of the substance, and these iron compounds act as catalysts and increase the rapidity with which the absorbent material expels and absorbs ammonia gas. The solidified mass is broken up into lumps of about one-quarter inch size and is then ready for use in absorption refrigeration systems.

The porosity and the resistance to crushing strain of our absorbent substance may be increased by adding sodium or potassium silicate to the mixture before the baking process. These silicates are preferably added in the proportion of about seven to eight parts of silicate to 100 parts of calcium chloride. When the silicates are employed, they form a siliceous skeleton for the calcium chloride which strengthens the absorbent substance and so increases its resistance to the crushing strains imposed thereon during packing and handling.

In certain cases, we prefer to subject our absorbent substance to a further treatment with ammonia gas under pressure before employing the substance in a refrigeration system. When this treatment is employed, the solidified and crushed substance is subjected to contact with gaseous ammonia under a pressure of from atmospheric to 150 lbs. per square inch for a period of from twenty-four to forty-eight hours, or until an appreciable amount of ammonia has been absorbed. This treatment greatly increases the volume of the solid absorbent substance and gives it a light and fluffy structure whereby its absorptive capacity is increased. Although some of the ammonia gas absorbed during this pressure treatment is driven off from the absorbent substance by the heat applied thereto in a refrigeration system, nevertheless the substance has been found to retain the light and fluffy structure and the high absorptive properties imparted thereto by the ammonia gas under pressure. In certain cases, the treatment of our improved absorbent substance by ammonia gas under pressure may be omitted, and the invention, in its broader aspects, is not limited to the inclusion of this treatment step.

The use of ammonium and iron salts in our absorbent substance improves the refrigerant absorbing quality thereof in two ways. The ammonia gas evolved and given off during the baking of the mixture forms a plurality of small and intricate passages therethrough and so provides an extremely porous structure having a large portion of its mass exposed for contact with the refrigerant gases which are to be absorbed. The iron oxide formed is distributed over the exposed surfaces of the porous mass and acts as a catalyst to increase the rate at which the calcium chloride expels and absorbs the ammonia refrigerant upon heating and cooling. Thus, by the use of ammonium and iron salts with the calcium chloride, both the absorptive capacity and the rate of absorption and distillation of our substance are increased.

We claim:
1. An absorbent substance comprising calcium chloride, an ammonium salt and an iron salt.
2. A highly porous absorbent substance comprising a baked mixture of calcium chloride, an ammonium salt, an iron salt and a silicate.
3. An absorbent substance comprising about 100 parts of calcium chloride, about 2 parts of an ammonium salt and about 1 part of an iron salt.
4. An absorbent substance comprising a baked mixture of about 100 parts of calcium chloride, about 2 parts of an ammonium salt, about 1 part of an iron salt and from 7 to 8 parts of sodium silicate.
5. An absorbent substance comprising a baked water mixture of about 100 parts of calcium chloride, about 2 parts of ammonium chloride and about 1 part of iron chloride.
6. An absorbent substance comprising a baked water mixture of about 100 parts of calcium chloride, about 2 parts of ammonium chloride, about 1 part of iron chloride and about 7 to 8 parts of sodium silicate.
7. A method of preparing an absorbent substance for refrigeration systems which comprises mixing calcium chloride, an ammonium salt and an iron salt, adding water to the mixture to form a paste and baking the paste to a solidified mass.
8. A method of preparing an absorbent substance for refrigeration systems which comprises forming a water paste of calcium chloride, ammonium chloride, iron chloride and sodium silicate and baking the paste to a solidified mass.
9. A method of preparing an absorbent substance for refrigeration systems which comprises forming a water paste of calcium chloride, ammonium chloride, iron chloride and sodium silicate and baking the paste at a temperature of about 200° C. until the mass solidifies and all of the water is driven off.
10. A method of preparing an absorbent substance for refrigeration systems which comprises forming a water paste of calcium chloride, ammonium chloride and iron chloride, baking the paste to a solidified mass and subjecting the mass to contact with ammonia gas under pressure.
11. A method of preparing an absorbent substance for refrigeration systems which comprises forming a water paste of about 100 parts of calcium chloride, about 2 parts of ammonium chloride and about 1 part of iron chloride, baking the paste to a solidified mass at a temperature of about 200° C., and subjecting the baked mass to contact with ammonia gas under pressure for a period of from 24 to 48 hours.
12. A method of preparing an absorbent substance for refrigeration systems which comprises forming a water paste of calcium chloride, an ammonium salt, an iron salt, and a silicate, baking the paste at a temperature of about 200° C. until all of the water has been driven off and the mass solidifies, and subjecting the solidified mass to contact with ammonia gas under pressure for a period of from 24 to 48 hours.

In testimony whereof we affix our signatures.

JOHN G. RUCKELSHAUS.
NORMAN W. KEMPF.